United States Patent
Fujiwara

(10) Patent No.: US 10,233,906 B2
(45) Date of Patent: Mar. 19, 2019

(54) JOINT MEMBER FOR WIND POWER GENERATION APPARATUS, AND WIND POWER GENERATION APPARATUS

(71) Applicant: JTEKT CORPORATION, Osaka-shi, Osaka (JP)

(72) Inventor: Hideki Fujiwara, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 62 days.

(21) Appl. No.: 15/113,552

(22) PCT Filed: Jan. 22, 2015

(86) PCT No.: PCT/JP2015/051602
§ 371 (c)(1),
(2) Date: Jul. 22, 2016

(87) PCT Pub. No.: WO2015/115286
PCT Pub. Date: Aug. 6, 2015

(65) Prior Publication Data
US 2017/0009748 A1    Jan. 12, 2017

(30) Foreign Application Priority Data
Jan. 30, 2014    (JP) ................. 2014-015584

(51) Int. Cl.
*F03D 15/00* (2016.01)
*F03D 9/00* (2016.01)
(Continued)

(52) U.S. Cl.
CPC .......... *F03D 15/00* (2016.05); *F03D 15/10* (2016.05); *F16D 41/066* (2013.01);
(Continued)

(58) Field of Classification Search
CPC .......... F03D 15/00; F03D 9/25; F16D 41/066; F16D 41/067; H02K 7/108; H02K 7/183;
(Continued)

(56) References Cited

U.S. PATENT DOCUMENTS 4,063,433 A * 12/1977 Chanton ............. F04C 15/0065
464/88
6,099,255 A    8/2000 Lee
(Continued)

FOREIGN PATENT DOCUMENTS

CN    2177125 Y    9/1994
CN    102017370 A    4/2011
(Continued)

OTHER PUBLICATIONS

Apr. 28, 2015 International Search Report issued in International Patent Application No. PCT/JP2015/051602.
(Continued)

*Primary Examiner* — Julio C. Gonzalez
*Assistant Examiner* — Joseph Ortega
(74) *Attorney, Agent, or Firm* — Oliff PLC

(57) ABSTRACT

A joint member for a wind power generation apparatus includes: a first rotor integrally rotating with an output shaft of a speed increaser; a second rotor integrally rotating with an input shaft of a generator; and a one-way clutch provided between the first rotor and the second rotor. A torsion promoting portion being readily twisted and elastically deformed is provided at a portion of the first rotor where power is transmitted from the output shaft to the one-way clutch.

11 Claims, 4 Drawing Sheets

(51) Int. Cl.
*F03D 9/25* (2016.01)
*F16D 41/066* (2006.01)
*H02K 7/108* (2006.01)
*F03D 15/10* (2016.01)
*F16D 41/067* (2006.01)
*H02K 7/18* (2006.01)

(52) U.S. Cl.
CPC ............ *F16D 41/067* (2013.01); *H02K 7/108* (2013.01); *H02K 7/183* (2013.01); *F05B 2220/706* (2013.01); *F05B 2240/221* (2013.01); *F05B 2240/61* (2013.01); *F05B 2250/311* (2013.01); *F05B 2260/4023* (2013.01); *F05B 2260/40311* (2013.01); *Y02E 10/725* (2013.01)

(58) Field of Classification Search
CPC .......... F05B 2220/706; F05B 2240/221; F05B 2240/61; F05B 2260/4023; F05B 2260/40311; Y02E 10/725
See application file for complete search history.

(56) References Cited

U.S. PATENT DOCUMENTS

| | | | |
|---|---|---|---|
| 6,688,191 B2* | 2/2004 | Canders | F16F 15/3153 74/572.11 |
| 2001/0054856 A1* | 12/2001 | Gabrys | F16F 15/305 310/261.1 |
| 2003/0017899 A1* | 1/2003 | Fujiwara | F16H 55/36 474/199 |
| 2003/0102677 A1 | 6/2003 | Becker et al. | |
| 2006/0117903 A1* | 6/2006 | Kobayashi | B21K 1/40 74/537 |
| 2008/0078647 A1* | 4/2008 | Watanabe | F16D 41/064 192/41 A |
| 2009/0298629 A1* | 12/2009 | Fujiwara | F16D 15/00 474/199 |
| 2011/0015018 A1* | 1/2011 | Yamatani | F02N 15/023 474/166 |
| 2011/0042965 A1* | 2/2011 | Atallah | H02K 7/11 290/1 C |
| 2011/0285137 A1 | 11/2011 | Casazza | |
| 2012/0045335 A1 | 2/2012 | Heidenreich et al. | |
| 2012/0201679 A1 | 8/2012 | Heidenreich et al. | |
| 2012/0291732 A1* | 11/2012 | Oe | F01L 1/352 123/90.15 |
| 2013/0062886 A1 | 3/2013 | Fujiwara et al. | |
| 2013/0134815 A1* | 5/2013 | Powell | H02K 7/1823 310/101 |
| 2015/0061436 A1 | 3/2015 | Fujiwara et al. | |

FOREIGN PATENT DOCUMENTS

| | | |
|---|---|---|
| CN | 102996366 A | 3/2013 |
| CN | 104254704 A | 12/2014 |
| DE | 102008009351 A1 | 8/2009 |
| EP | 1251268 A2 | 10/2002 |
| JP | 2003-056451 A | 2/2003 |
| JP | 2013-060825 A | 4/2013 |
| JP | 2013-076395 A | 4/2013 |
| WO | 2013/162734 A1 | 10/2013 |

OTHER PUBLICATIONS

Aug. 2, 2016 International Preliminary Report on Patentability issued in International Patent Application No. PCT/JP2015/051602.
Sep. 1, 2017 Search Report issued in European Patent Application No. 15743090.1.
Jun. 4, 2018 Office Action issued in Chinese Patent Application No. 201580005867.9.

* cited by examiner

JOINT MEMBER FOR WIND POWER GENERATION APPARATUS, AND WIND POWER GENERATION APPARATUS

TECHNICAL FIELD

An aspect of the present invention relates to a joint member for a wind power generation apparatus, and a wind power generation apparatus.

BACKGROUND ART

As a wind power generation apparatus, an apparatus is known which is equipped with a blade that is rotated by receiving wind power; a main spindle connected to the blade; a speed increaser for increasing the rotation of the main spindle, and a generator including an input shaft that is connected to the output shaft of the speed increaser via a joint member. In this wind power generation apparatus, the blade receives wind power and the main spindle is rotated, the rotation of the main spindle is increased by the speed increaser to drive the generator, whereby electric power is generated. In the following explanation in this description, wind power means wind power received by the blade.

In this kind of wind power generation apparatus, when wind changes in speed and direction and wind power lowers, the rotation of the output shaft of the speed increaser is decreased, and this decreased rotation is transmitted to the input shaft of the generator via the joint member. Hence, the rotation of the input shaft of the generator is decreased. Thus, the output of the generator is lowered, thereby causing a problem of poor power generation efficiency. In order to solve this problem, the inventors of this application have already proposed an invention in which a one-way clutch is provided for the joint member (refer to Patent Document 1).

This one-way clutch is used so that when the rotation speed of the output shaft of the speed increaser is higher than the rotation speed of the input shaft of the generator, the input shaft and the output shaft are connected to each other so as to be rotatable integrally and so that when the rotation speed of the output shaft is lower than the rotation speed of the input shaft, the connection between the output shaft and the input shaft is released. Furthermore, in the case that wind power lowers and the rotation speed of the output shaft of the speed increaser is decreased, the connection between the output shaft and the input shaft of the generator is released by the one-way clutch, whereby the rotation of the input shaft of the generator is not decreased abruptly but the input shaft can be continuously rotated by the inertia of the heavy rotor of the generator, and the average rotation speed of the input shaft is increased and power generation efficiency is improved.

RELATED ART DOCUMENTS

Patent Documents

Patent Document 1: JP-A-2013-60825

SUMMARY OF THE INVENTION

Problem to be Solved by the Invention

With respect to the joint member equipped with the above-mentioned one-way clutch, a new problem has been found while studies have been further made earnestly by the applicants. More specifically, in the above-mentioned wind power generation apparatus, in the case that after wind power lowers and the connection between the output shaft of the speed increaser and the input shaft of the generator is released, wind power abruptly increases and the rotation speed of the output shaft is abruptly increased and becomes higher than the rotation speed of the input shaft, the reconnection between the output shaft and the input shaft by the one-way clutch is sometimes carried out instantaneously. In this case, it is conceived that large impulsive torque is instantaneously exerted from the one-way clutch to the output shaft of the speed increaser in the direction opposite to the rotation direction of the output shaft due to the reaction (counter action) of the reconnection performed instantaneously. Hence, large mechanical stress may be exerted to the speed increaser and may adversely affect the durability of the speed increaser, and this has been found as a new problem. It is assumed that this kind of phenomenon will significantly occur in regions where wind power and wind direction abruptly change.

Accordingly, an aspect of the present invention is intended to provide a joint member for a wind power generation apparatus and a wind power generation apparatus capable of solving the problem that adverse effects to the durability of the speed increaser due to large mechanical stress exerted to the speed increaser may occur when wind power changes abruptly.

Means for Solving the Problem

A first aspect of the present invention provides a joint member for a wind power generation apparatus, which is used for the wind power generation apparatus that generates electric power by rotating an input shaft of a generator by torque from an output shaft of a speed increaser, the joint member including: a first rotor integrally rotating with the output shaft; a second rotor disposed coaxially with the first rotor and integrally rotating with the input shaft; and a one-way clutch which is provided between the first rotor and the second rotor, which connects the first rotor and the second rotor to each other so as to be integrally rotatable when a rotation speed of the output shaft is higher than a rotation speed of the input shaft, and which releases connection between the first rotor and the second rotor when the rotation speed of the output shaft is lower than the rotation speed of the input shaft, wherein a torsion promoting portion being readily twisted and elastically deformed is provided at a portion of the first rotor where power is transmitted from the output shaft to the one-way clutch.

With this configuration, in the case that wind power increases, the rotation speed of the first rotor is increased and the rotation speed of the first rotor becomes higher than the rotation speed of the second rotor in the one-way clutch, the first rotor and the second rotor are connected to each other so as to be rotatable integrally.

Furthermore, in the case that after the rotation speed of the first rotor is increased, wind power becomes constant, the rotation speed of the first rotor becomes constant, and the rotation speed of the first rotor becomes equal to the rotation speed of the second rotor, the first rotor and the second rotor continue to integrally rotate.

On the other hand, in the case that after the rotation speed of the first rotor is increased, wind power lowers, the rotation speed of the first rotor is decreased, and the rotation speed of the first rotor becomes lower than the rotation speed of the second rotor, the connection between the first rotor and the second rotor is cut off.

In the case that after the cut-off, wind power abruptly increases and the rotation speed of the first rotor is abruptly increased and becomes higher than the rotation speed of the second rotor, the reconnection between the first rotor and the second rotor is sometimes instantaneously performed by the one-way clutch. In this case, large impulsive torque directed to the speed increaser is instantaneously exerted from the one-way clutch to the first rotor in the direction opposite to the rotation direction of the first rotor due to the reaction (counter action) of the reconnection instantaneously performed.

At this time, with the configuration according to the first aspect of the present invention, the torsion promoting portion provided in the portion of the first rotor where the power is transmitted from the output shaft to the one-way clutch is twisted and elastically deformed, and the impulsive torque directed toward the speed increaser is decreased, whereby the large impulsive torque can be suppressed from being exerted to the speed increaser. Consequently, adverse effects to the durability of the speed increaser due to large mechanical stress caused by the above-mentioned impulsive torque and exerted to the speed increaser can be suppressed.

Furthermore, it is preferable that the torsion promoting portion resides in a portion of the first rotor from an end portion on a side of the output shaft to a position corresponding to an arrangement position of the one-way clutch in an axial direction, and that a rigidity against torsion at the torsion promoting portion is made lower than that at a portion from an end portion of the second rotor on a side of the input shaft to a position corresponding to the arrangement position of the one-way clutch in the axial direction.

With this configuration, the portion included in the first rotor and required to reduce the impulsive torque directed to the speed increaser is used as the torsion promoting portion that is low in rigidity against torsion.

Furthermore, an axial length of the torsion promoting portion is set to be longer than half an entire axial length of a joint member body portion including the first rotor and the second rotor.

With this configuration, the torsion promoting portion being long in the axial direction is obtained. In other words, a configuration is obtained in which the above-mentioned impulsive torque is easily absorbed by the torsion at the torsion promoting portion.

Moreover, it is preferable that the torsion promoting portion is formed of a hollow shaft portion.

Since a hollow shaft is lower than a solid shaft in rigidity against torsion and the torsion promoting portion is formed of a hollow shaft portion, the rigidity against torsion at the torsion promoting portion can be lowered by the simple configuration.

A second aspect of the present invention provides a wind power generation apparatus including: a main spindle that is rotated by wind power; a speed increaser including an output shaft from which increased rotation of the main spindle is output; a generator which includes an input shaft that is rotated when the rotation of the output shaft is input and which generates electric power by the rotation of the input shaft; and the joint member for the wind power generation apparatus according to the first aspect, which is provided between the output shaft and the input shaft to enable torque transmission between the output shaft and the input shaft.

With this configuration, since the joint member for the wind power generation apparatus including the first rotor including the torsion promoting portion is used, large mechanical stress can be suppressed from being exerted to the speed increaser when wind power abruptly changes.

Advantages of the Invention

According to an aspect of the present invention, adverse effects to the durability of the speed increaser due to large mechanical stress exerted to the speed increaser when wind power changes abruptly can be suppressed.

MODE FOR CARRYING OUT THE INVENTION

Figure 1:
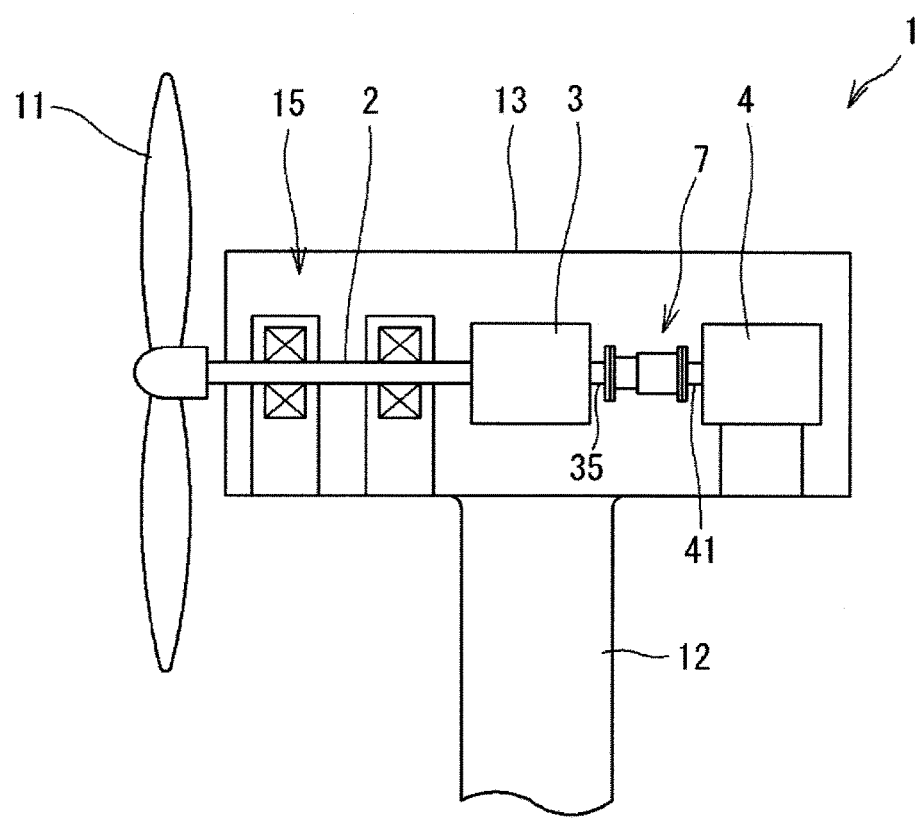
FIG. 1 is a schematic side view showing a wind power generation apparatus equipped with a joint member for a wind power generation apparatus according to an embodiment of the present invention.

A preferred embodiment according to the present invention will be described below referring to the accompanying drawings. FIG. 1 is a schematic side view showing a wind power generation apparatus equipped with a joint member for a wind power generation apparatus according to the embodiment of the present invention. As shown in FIG. 1, a wind power generation apparatus 1 is configured so as to generate electric power by rotating the input shaft 41 of a generator 4 using torque from the output shaft 35 of a speed increaser 3, and a joint member 7 for a wind power generation apparatus according to the embodiment of the present invention is used for the wind power generation apparatus 1 configured as described above.

The wind power generation apparatus 1 will be described specifically; the wind power generation apparatus 1 is equipped with a blade (wind receiving member) 11, a column 12, and a nacelle 13. The blade 11 is formed of a plurality of vanes provided at the tip end of a main spindle 2 and rotates the main spindle 2 upon receiving wind. The nacelle 13 is equipped with the main spindle 2, a supporting mechanism 15 for supporting the main spindle 2, a speed increaser 3 for increasing the rotation_of the main spindle 2, a generator 4 for generating electric power using the power of the rotation increased by the speed increaser 3, or the like. The column 12 supports the nacelle 13 so that the nacelle 13 is turnable horizontally around an axial center thereof extending in the up-down direction.

Figure 2:
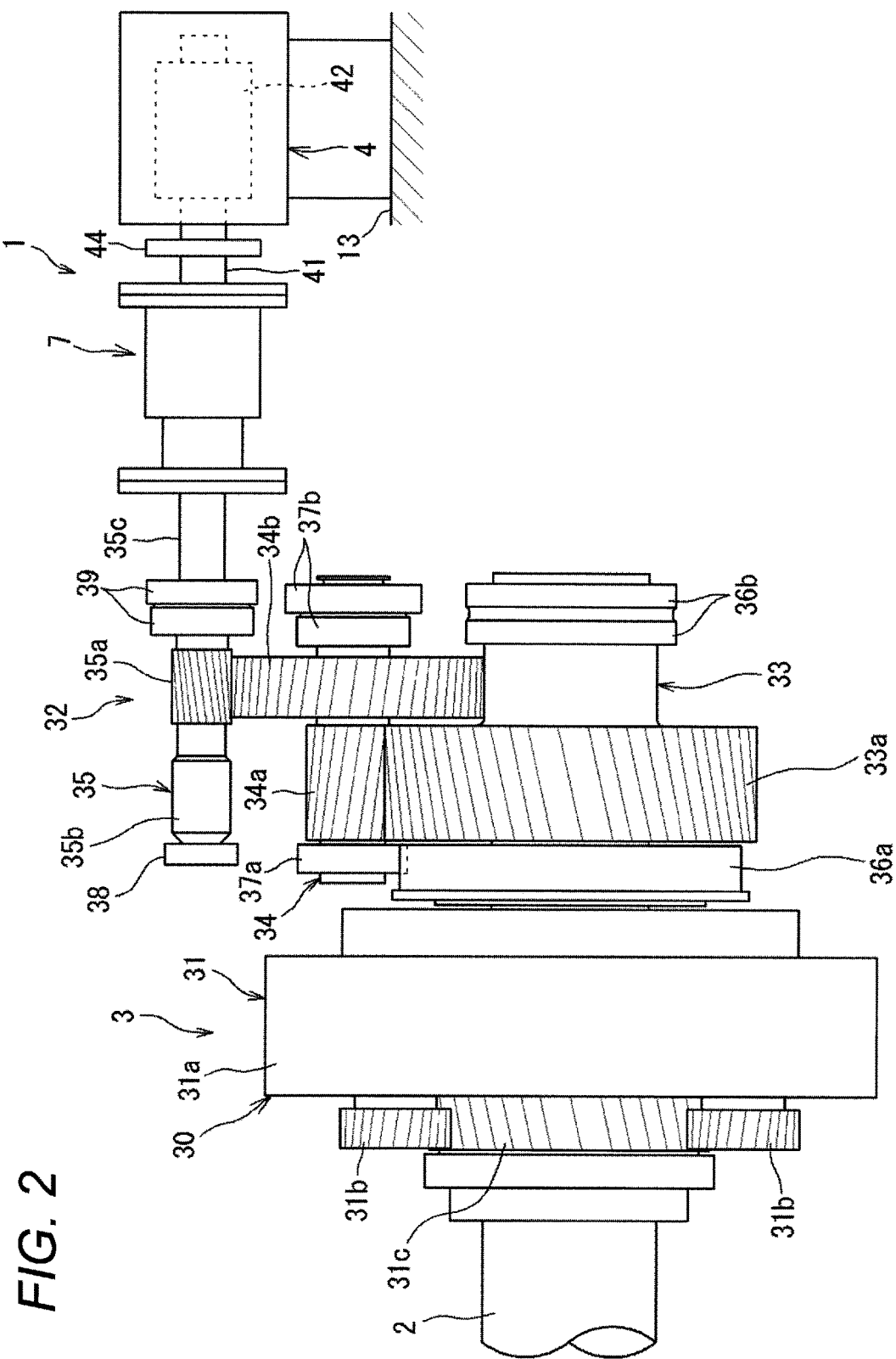
FIG. 2 is a schematic side view showing the speed increaser and the generator shown in FIG. 1.

FIG. 2 is a schematic side view showing the speed increaser 3 and the generator 4. As shown in FIG. 2, the generator 4 is configured, for example, using an induction generator, and includes the input shaft 41 to which the rotation increased by the speed increaser 3 is input so that the input shaft 41 is rotated, a rotor 42 incorporated in the generator 4, a stator, not shown, or the like. The rotor 42 is connected to the input shaft 41 so as to be integrally rotatable therewith, and the generator 4 is configured so that the input shaft 41 rotates to drive the rotor 42, thereby generating electric power. In addition, on the input shaft 41, a brake 44 for braking the input shaft 41 is provided.

The speed increaser 3 is equipped with a gear mechanism (rotation transmission mechanism) 30 to which the rotation of the main spindle 2 is input and in which the rotation is increased. This gear mechanism 30 is equipped with a planetary gear mechanism 31 and a high speed stage gear mechanism 32 to which the rotation increased by the planetary gear mechanism 31 is input and in which the rotation is further increased.

The planetary gear mechanism 31 includes an internal gear (ring gear) 31a, a plurality of planetary gears 31b being held by a planetary carrier (not shown) that is connected to the main spindle 2 so as to be rotatable integrally therewith, and a sun gear 31c engaged with the planetary gears 31b. With this configuration, when the planetary carrier is rotated together with the main spindle 2, the sun gear 31c is rotated via the planetary gears 31b, and the rotation is transmitted to the low-speed shaft 33 of the high speed stage gear mechanism 32.

The high speed stage gear mechanism 32 is equipped with the low-speed shaft 33 including a low-speed gear 33a, an intermediate shaft 34 including a first intermediate gear 34a and a second intermediate gear 34b, and an output shaft 35 including a high-speed gear 35a.

The low-speed shaft 33 is formed of a large rotation shaft having a diameter of approximately 1 m, for example, and is disposed coaxially with the main spindle 2. Both the end portions of the low-speed shaft 33 in the axial direction are rotatably supported by roller bearings 36a and 36b.

The intermediate shaft 34 is disposed in parallel with the low-speed shaft 33, and both the end portions of the intermediate shaft in the axial direction are rotatably supported by roller bearings 37a and 37b. The first intermediate gear 34a of the intermediate shaft 34 is engaged with the low-speed gear 33a, and the second intermediate gear 34b is engaged with the high-speed gear 35a.

The output shaft 35 is disposed in parallel with the intermediate shaft 34 and outputs rotation torque. The one end portion 35b side and the other end portion (output end portion) 35c side of the output shaft 35 in the axial direction are rotatably supported by roller bearings 38 and 39, respectively.

With the above-mentioned configuration, the rotation of the main spindle 2 is increased in three steps according to the gear ratio of the planetary gear mechanism 31, the gear ratio between the low-speed gear 33a and the first intermediate gear 34a, and the gear ratio between the second intermediate gear 34b and the high-speed gear 35a, and the rotation is output from the output end portion 35c of the output shaft 35. In other words, the rotation of the main spindle 2 by wind power is increased in three steps by the speed increaser 3 and output from the output shaft 35, whereby the generator 4 is driven by the rotation torque of the output shaft 35.

Between the output shaft 35 of the speed increaser 3 and the input shaft 41 of the generator 4, the joint member (joint device, joint structure, coupling) 7 for the wind power generation apparatus is equipped so that torque can be transmitted between the output shaft 35 and the input shaft 41. In the embodiment, the joint member 7 is provided on the side of the speed increaser 3 rather than on the side of the brake 44 for the input shaft 41.

Figure 3:
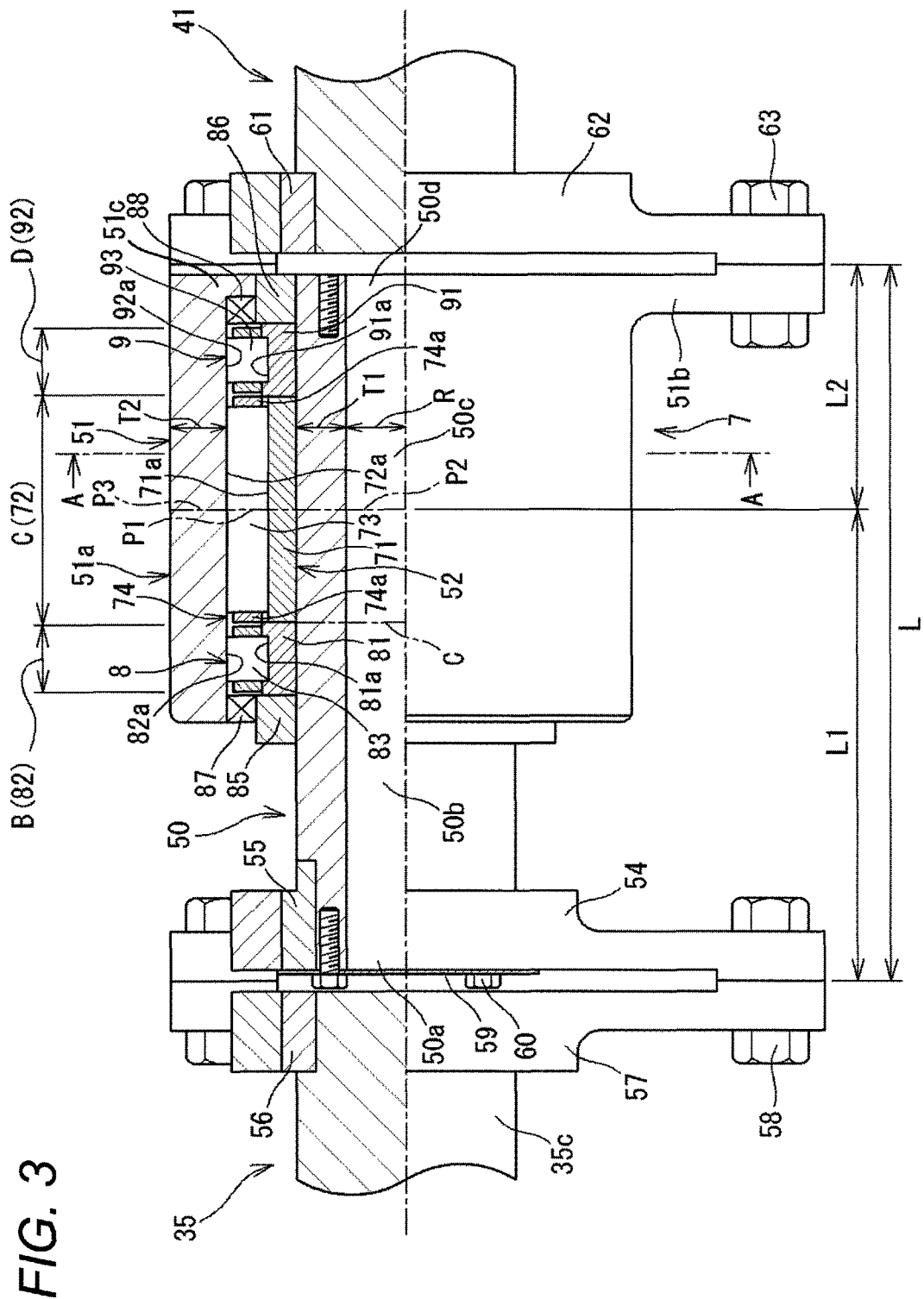
FIG. 3 is a half-sectional view showing the joint member for the wind power generation apparatus shown in FIG. 2.
Figure 4:
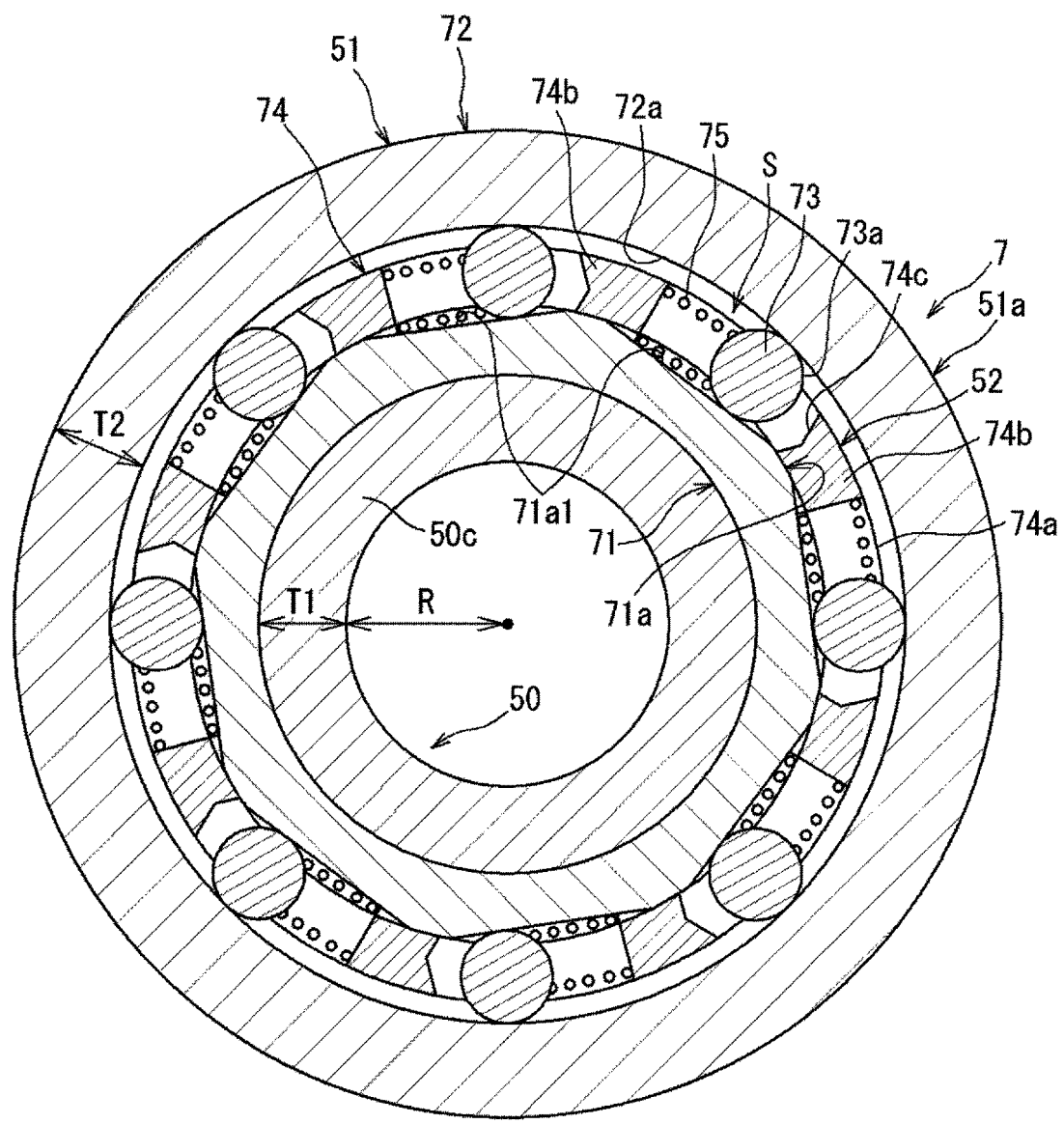
FIG. 4 is a sectional view taken in arrow A in FIG. 3.

FIG. 3 is a half-sectional view showing the joint member 7, and FIG. 4 is a sectional view taken in arrow A in FIG. 3. As shown in FIGS. 3 and 4, the joint member 7 includes a first rotor 50, a second rotor 51, a one-way clutch 52, and a pair of rolling bearings 8 and 9. The one-way clutch 52 and the rolling bearings 8 and 9 are disposed between the first rotor 50 and the second rotor 51.

The first rotor 50 is disposed coaxially with the output shaft 35, a flange 54 is provided at the end portion 50a thereof on the side of the output shaft 35, and the flange 54 and the first rotor 50 are made integrally rotatable using a key 55. The flange 57 held on the output shaft 35 using a key 56 is fixed to the flange 54 using fastening members 58 in the form of bolts and nuts. A cover 59 is fixed to the end portion 50a of the first rotor 50 on the side of the output shaft 35 with bolts 60, and the end face of the key 55 is covered with this cover 59.

The first rotor 50 is a hollow shaft over the entire length in the axial direction. The radial thickness (wall thickness) T1 of the first rotor 50 is made smaller than the radius R of the inner peripheral face of the first rotor 50 and the radial thickness (wall thickness) T2 of the second rotor 51; the radial thickness T1 is set as, for example, approximately 20 mm, and the radial thickness T2 is set as, for example, approximately 30 mm. In addition, it is preferable that the material of the first rotor 50 is low in rigidity against torsion and is made of, for example, S25C serving as carbon steel for machine structural use, titanium or fiber reinforced plastic (FRP).

The second rotor 51 is disposed so as to be coaxial with the first rotor 50. The second rotor 51 includes a cylindrical portion 51a positioned on the radial outside of the first rotor 50 and a flange portion 51b extending radially outside from the end portion of the cylindrical portion 51a on the side of the input shaft 41. The cylindrical portion 51a is formed of a cylindrical member and is overlapped with the axial center portion of the first rotor 50 and the portion of the axial center portion on the side of the input shaft 41 in the radial direction.

To the flange 62 that is held on the input shaft 41 using a key 61 or the like, the flange portion 51b is fixed using fastening members 63 in the form of bolts and nuts. The material of the second rotor 51 is, for example, bearing steel (SUJ2).

Furthermore, the rigidity of the first rotor 50 against torsion is made lower than the rigidity of the second rotor 51 against torsion.

The one-way clutch 52 is provided between the first rotor 50 and the second rotor 51. The one-way clutch 52 is equipped with an inner ring 71, an outer ring 72, a plurality of rollers (engaging elements) 73 disposed between the outer peripheral face 71a of the inner ring 71 and the inner peripheral face 72a of the outer ring 72, a ring-shaped cage 74 for holding the rollers 73 at predetermined intervals along the circumferential direction, and a plurality of elastic members 75 elastically energizing the rollers 73 toward one side in the circumferential direction (see FIG. 4).

In the embodiment, in FIG. 3, the axial center position of the roller 73 in the one-way clutch 52, that is, the axial center position of the connection portion (engaging portion) formed of the roller 73, the inner ring 71 and the outer ring 72, is defined as the arrangement position P1 of the one-way clutch 52.

The arrangement position P1 of the one-way clutch 52 is located on the side of the input shaft 41 from the axial center position C of the first rotor 50. In other words, the one-way clutch 52 is not disposed at the center between the output shaft 35 and the input shaft 41, but is disposed closer to the input shaft 41 side (on the right side in FIG. 3).

The inner ring 71 is fitted on and fixed to the portion of the first rotor 50 on the side close to the input shaft 41 and rotates integrally with the first rotor 50. The region C at the nearly central portion of the cylindrical portion 51a of the second rotor 51 in the axial direction has a function serving as the outer ring 72 of the one-way clutch 52, and the inner peripheral face of the region C is used as the inner peripheral face 72a of the outer ring 72.

The rollers 73, being cylindrical in shape and eight in number, are disposed in the circumferential direction in the embodiment.

The cage 74 holds the rollers 73 at equal intervals. The cage 74 includes a pair of ring-shaped portions 74a opposing each other in the axial direction, and also includes a plurality of pillar portions 74b (see FIG. 4) extending in the axial direction between both the ring-shaped portions 74a and arranged at equal intervals in the circumferential direction. These pillar portions 74b are used to connect the two ring-shaped portions 74a. Furthermore, a pocket 74c is formed between the two ring-shaped portions 74a and between the pair of pillar portions 74b adjacent to each other in the circumferential direction and each roller 73 is individually accommodated in each pocket 74c.

The elastic member 75, formed of a compression spring, is individually accommodated in each pocket 74c of the cage 74 and mounted at the pillar portion 74b.

In FIG. 4, cam faces 71a1, being flat and as many (eight) as the rollers 73, are formed on the outer peripheral face 71a of the inner ring 71, and the inner peripheral face 72a of the outer ring 72 is a cylindrical face. Between the cam faces 71a1 of the inner ring 71 and the cylindrical face 72a of the outer ring 72, a plurality (eight) of wedge-shaped spaces S are formed in the circumferential direction. Moreover, the roller 73 is individually disposed in each wedge-shaped space S, and the elastic member 75 energizes the roller 73 in the direction of making the wedge-shaped space S narrower. The outer peripheral face of the roller 73 serves as a contact face 73a which contacts the cam face 71a1 of the inner ring 71 and the inner peripheral face 72a of the outer ring 72, and the contact face 73a is formed straight in the width direction (the axial direction).

In FIG. 3, the pair of rolling bearings 8 and 9 is disposed on both sides of the rollers 73 in the axial direction and between the first rotor 50 and the cylindrical portion 51a of the second rotor 51, thereby supporting the first rotor 50 and the second rotor 51 so as to be rotatable mutually.

The rolling bearings 8 and 9 are cylindrical roller bearings equipped with inner rings 81 and 91, outer rings 82 and 92, and pluralities of cylindrical rollers 83 and 93 rotatably disposed between the inner rings 81 and 91 and the outer rings 82 and 92.

The inner rings 81 and 91 are fitted on the first rotor 50, and inner ring raceway faces 81a and 91a are formed on the outer peripheral faces thereof. The region B and the region D on the sides of both end portions of the cylindrical portion 51a of the second rotor 51 in the axial direction have functions serving as the outer rings 82 and 92 of the rolling bearings 8 and 9, and the inner peripheral faces of the regions B and D are used to serve as the outer ring raceway faces 82a and 92a of the outer rings 82 and 92. Cylindrical rollers 83 and 93 are rotatably disposed between the outer ring raceway faces 82a and 92a and the inner ring raceway faces 81a and 91a.

A pair of ring-shaped members 85 and 86 is fitted on and fixed to the outer peripheral face of the first rotor 50. The ring-shaped member 85 on the side of the output shaft 35 contacts the end portion of the inner ring 81 of the rolling bearing 8 on the side of the output shaft 35 in the axial direction, and the ring-shaped member 86 on the side of the input shaft 41 contacts the end portion of the inner ring 91 of the rolling bearing 9 on the side of the input shaft 41 in the axial direction. Sealing members 87 and 88 are interposed between the outer peripheral faces of the ring-shaped members 85 and 86 and the inner peripheral faces of both end portions of the cylindrical portion 51a of the second rotor 51 in the axial direction.

Furthermore, in the first rotor 50, the portion thereof from the end portion (the left end portion in FIG. 3) 50a on the side of the output shaft 35 to the corresponding position P2 corresponding to the arrangement position P1 of the one-way clutch 52 in the axial direction, that is, a portion of the first rotor 50 where power is transmitted from the output shaft 35 to the one-way clutch 52, is used as a torsion promoting portion 50b that is readily twisted and elastically deformed. In other words, the torsion promoting portion 50b has a torsion-bar-like spring function. The above-mentioned torsional elastic deformation is the deformation around the center line of the first rotor 50.

In particular, in the embodiment, the rigidity against torsion at the torsion promoting portion 50b is made lower than that at the portion (this portion is hereafter referred to as the portion on the side of the second rotor 51) from the end portion 51c of the second rotor 51 on the side of the input shaft 41 to the corresponding position P3 corresponding to the arrangement position P1 of the one-way clutch 52 in the axial direction.

The sentence stating that "the rigidity against torsion at the torsion promoting portion 50b is made lower than that at the portion on the side of the second rotor 51" means that "the relative displacement amount (torsion amount, torsion angle) at the torsion promoting portion 50b in the circumferential direction is larger than the relative displacement amount (torsion amount, torsion angle) at the portion on the side of the second rotor 51 in the circumferential direction" in the case that the body portion of the joint member (the joint member 7) including the one-way clutch 52, which is in a locked state (described later) wherein the first rotor 50 and the second rotor 51 are connected so as to be rotatable integrally, is twisted and elastically deformed.

The remaining portion 50c other than the torsion promoting portion 50b of the first rotor 50, that is, the portion from the corresponding position P2 of the first rotor 50 to the end portion 50a on the side of the input shaft 41, is assumed to be a portion in which torsional elastic deformation is not required to be considered particularly.

The torsion promoting portion 50b will be further described. As described above, in the first rotor 50, the corresponding position P2 corresponding to the arrangement position P1 of the one-way clutch 52 in the axial direction is used as a boundary, and the side of the output shaft 35 from this boundary is allowed to function as the torsion promoting portion 50b.

In addition, since the corresponding position P2 is disposed on the side of the input shaft 41 from the axial center position C of the first rotor 50, the axial length L1 of the torsion promoting portion 50b is set to be longer than half the entire axial length L of the body portion of the joint member (the joint member 7) including the first rotor 50 and the second rotor 51. The axial length of the remaining portion 50c of the first rotor 50 is set as L2.

With the joint member 7 including the one-way clutch 52 and the torsion promoting portion 50b being configured as described above, in the case that wind power increases, the rotation speed of the first rotor 50 is increased and the rotation speed of the first rotor 50 becomes higher than the rotation speed of the second rotor 51 in the one-way clutch 52, the inner ring 71 tends to rotate relatively with respect to the outer ring 72 in one direction (the counterclockwise direction in FIG. 4).

In this case, the roller 73 is slightly moved in the direction of making the wedge-shaped space S be narrower by the energizing force of the elastic member 75, and the contact face 73a of the roller 73 pressure-contacts the outer peripheral face 71a of the inner ring 71 and the inner peripheral face 72a of the outer ring 72, whereby the one-way clutch 52 is maintained in a state in which the roller 73 is engaged between the inner ring 71 and the outer ring 72. As a result, the inner ring 71 and the outer ring 72 can integrally rotate in the one direction, whereby the first rotor 50 and the second rotor 51 can be connected to each other so as to be integrally rotatable. This state in which the rotors are connected to each other so as to be integrally rotatable is referred to as "locked state."

Furthermore, in the case that after the rotation speed of the first rotor 50 is increased, wind power becomes constant, the rotation speed of the first rotor 50 becomes constant, and the rotation speed of the first rotor 50 becomes equal to the rotation speed of the second rotor 51, the rollers 73 are held in a state (locked state) of being engaged between the inner ring 71 and the outer ring 72. Hence, the one-way clutch 52 is maintained in a state in which the inner ring 71 and the outer ring 72 integrally rotate in the one direction, and the first rotor 50 and the second rotor 51 continue to integrally rotate.

On the other hand, in the case that after the rotation speed of the first rotor 50 is increased, wind power lowers, the rotation speed of the first rotor 50 is decreased, and the rotation speed of the first rotor 50 becomes lower than the rotation speed of the second rotor 51, the inner ring 71 tends to rotate relatively with respect to the outer ring 72 in the other direction (the clockwise direction in FIG. 4). In this case, the roller 73 is slightly moved in the direction of making the wedge-shaped space S wider against the energizing force of the elastic member 75, whereby the engagement between the roller 73 and the inner and outer rings 71 and 72 is released. Since the engagement of the roller 3 is released in this way, the connection between the first rotor 50 and the second rotor 51 is cut off. This state in which the connection is cut off is referred to as "unlocked state."

Then, in the case that after the cut-off in the one-way clutch 52, wind power increases abruptly and the rotation speed of the first rotor 50 is abruptly increased and becomes higher than the rotation speed of the second rotor 51, the roller 73 engages instantaneously with the inner ring 71 and the outer ring 72, whereby the first rotor 50 is instantaneously connected to the second rotor 51. In this case, large impulsive torque directed to the speed increaser 3 is instantaneously exerted from the one-way clutch 52 to the first rotor 50 in the direction opposite to the rotation direction of the first rotor 50 due to the reaction (counter action) of the reconnection performed instantaneously.

At this time, in the first rotor 50 according to the embodiment, the torsion promoting portion 50b provided in a portion where the power is transmitted from the output shaft 35 to the one-way clutch 52 is twisted and elastically deformed, and the impulsive torque directed toward the speed increaser 3 is decreased. Hence, large impulsive torque can be suppressed from being exerted to the output shaft 35 of the speed increaser 3. Consequently, adverse effects to the durability of the speed increaser 3 due to large mechanical stress caused by the above-mentioned impulsive torque and exerted to the speed increaser 3 can be suppressed.

Furthermore, after the above-mentioned reconnection, the torsion promoting portion 50b of the first rotor 50 returns to an original state thereof by virtue of its elastic restoring force.

As described above, in the embodiment, the portion of the first rotor 50 where the power is transmitted from the output shaft 35 to the one-way clutch 52, that is, the portion included in the first rotor 50 and required to reduce the impulsive torque exerted to the speed increaser 3, is used as the torsion promoting portion 50b that is readily twisted and elastically deformed.

Moreover, in structural mechanics, a hollow shaft is lower than a solid shaft in rigidity against torsion even though the shafts have the same outside diameter. Hence, in the embodiment, the torsion promoting portion 50b is formed of a hollow shaft portion. Since the torsion promoting portion 50b is formed of a hollow shaft portion as described above, the rigidity against torsion at the torsion promoting portion 50b can be lowered by using the simple configuration.

In addition, in the embodiment, the axial length L1 of the torsion promoting portion 50b is set to be longer than half the entire axial length L of the body portion of the joint member (the joint member 7) as described above, whereby the torsion promoting portion 50b being long in the axial direction is obtained. In other words, a configuration is obtained in which the above-mentioned impulsive torque is easily absorbed by the torsion at the torsion promoting portion 50b.

The first rotor 50 and the second rotor 51 may be made of materials different from each other so that the rigidity of the first rotor 50 against torsion becomes lower than the rigidity of the second rotor 51 against torsion. For example, the first rotor 50 may be made of a material having low rigidity against torsion, and on the other hand, the material of the second rotor 51 may be selected by placing importance on the cost and strength of the material. In other words, the rigidity of the material of the first rotor 50 against torsion may be smaller than the rigidity of the material of the second rotor 51 against torsion.

The present invention can be carried out by making appropriate modifications without being limited by the above-mentioned embodiment. For example, although the second rotor 51 is disposed on the outer peripheral side of the first rotor 50 in the embodiment, the arrangement may be reversed; the first rotor 50 may be formed of a cylindrical member and the second rotor 51 having a shaft shape may be disposed on the inner peripheral side of the cylindrical member. Even in this case, the first rotor 50 is provided with the torsion promoting portion 50b, and the torsion promoting portion 50b is configured so as to be lower in rigidity against torsion than the portion on the side of the second rotor 51. Furthermore, the wind power generation apparatus 1 is not limited to the horizontal axis type shown in FIG. 1 but may be a vertical axis type.

The present application is based on Japanese Patent Application (Application No. 2014-015584) filed on Jan. 30, 2014, and the contents thereof are herein incorporated by reference.

DESCRIPTION OF REFERENCE SIGNS

1: Wind Power Generation Apparatus, 2: Main Spindle, 3: Speed Increaser, 4: Generator, 7: Joint Member, 35: Output Shaft, 41: Input Shaft, 50: First Rotor, 50a: End Portion, 50b: Torsion Promoting Portion, 50c: Remaining Portion, 51: Second Rotor, 52: One-Way Clutch, L: Entire Axial Length, L1: Axial Length, P1: Arrangement Position, P2: Corresponding Position, P3: Corresponding Position

The invention claimed is:

1. A joint member for a wind power generation apparatus, which is used for the wind power generation apparatus that generates electric power by rotating an input shaft of a generator by torque from an output shaft of a speed increaser, said joint member comprising:
- a first rotor integrally rotating with the output shaft, the first rotor including a torsion promoting portion having a rigidity that is lower than a remainder of the first rotor;
- a second rotor disposed coaxially with the first rotor and integrally rotating with the input shaft; and
- a one-way clutch which is provided between the first rotor and the second rotor, which connects the first rotor and the second rotor to each other so as to be integrally rotatable when a rotation speed of the output shaft is higher than a rotation speed of the input shaft, and which releases connection between the first rotor and the second rotor when the rotation speed of the output shaft is lower than the rotation speed of the input shaft,
- wherein the torsion promoting portion being readily twisted and elastically deformed at a portion of the first rotor where power is transmitted from the output shaft to the one-way clutch.

2. The joint member for a wind power generation apparatus according to claim 1,
- wherein the torsion promoting portion resides in a portion of the first rotor from an end portion on a side of the output shaft to a position corresponding to an arrangement position of the one-way clutch in an axial direction, and
- wherein a rigidity against torsion at the torsion promoting portion is made lower than that at a portion from an end portion of the second rotor on a side of the input shaft to a position corresponding to the arrangement position of the one-way clutch in the axial direction.

3. The joint member for a wind power generation apparatus according to claim 2,
- wherein an axial length of the torsion promoting portion is set to be longer than half an entire axial length of a joint member body portion comprising the first rotor and the second rotor.

4. The joint member for a wind power generation apparatus according to claim 3,
- wherein the torsion promoting portion is formed of a hollow shaft portion.

5. A wind power generation apparatus comprising:
- a main spindle that is rotated by wind power;
- a speed increaser comprising an output shaft from which increased rotation of the main spindle is output;
- a generator which comprises an input shaft that is rotated when the rotation of the output shaft is input and which generates electric power by the rotation of the input shaft; and
- the joint member for the wind power generation apparatus according to claim 3, which is provided between the output shaft and the input shaft to enable torque transmission between the output shaft and the input shaft.

6. The joint member for a wind power generation apparatus according to claim 2,
- wherein the torsion promoting portion is formed of a hollow shaft portion.

7. A wind power generation apparatus comprising:
- a main spindle that is rotated by wind power;
- a speed increaser comprising an output shaft from which increased rotation of the main spindle is output;
- a generator which comprises an input shaft that is rotated when the rotation of the output shaft is input and which generates electric power by the rotation of the input shaft; and
- the joint member for the wind power generation apparatus according to claim 6, which is provided between the output shaft and the input shaft to enable torque transmission between the output shaft and the input shaft.

8. A wind power generation apparatus comprising:
- a main spindle that is rotated by wind power;
- a speed increaser comprising an output shaft from which increased rotation of the main spindle is output;
- a generator which comprises an input shaft that is rotated when the rotation of the output shaft is input and which generates electric power by the rotation of the input shaft; and
- the joint member for the wind power generation apparatus according to claim 2, which is provided between the output shaft and the input shaft to enable torque transmission between the output shaft and the input shaft.

9. The joint member for a wind power generation apparatus according to claim 1,
- wherein the torsion promoting portion is formed of a hollow shaft portion.

10. A wind power generation apparatus comprising:
- a main spindle that is rotated by wind power;
- a speed increaser comprising an output shaft from which increased rotation of the main spindle is output;
- a generator which comprises an input shaft that is rotated when the rotation of the output shaft is input and which generates electric power by the rotation of the input shaft; and
- the joint member for the wind power generation apparatus according to claim 9, which is provided between the output shaft and the input shaft to enable torque transmission between the output shaft and the input shaft.

11. A wind power generation apparatus comprising:
- a main spindle that is rotated by wind power;
- a speed increaser comprising an output shaft from which increased rotation of the main spindle is output;
- a generator which comprises an input shaft that is rotated when the rotation of the output shaft is input and which generates electric power by the rotation of the input shaft; and
- the joint member for the wind power generation apparatus according to claim 1, which is provided between the output shaft and the input shaft to enable torque transmission between the output shaft and the input shaft.

* * * * *